US012112645B2

(12) United States Patent
He et al.

(10) Patent No.: US 12,112,645 B2
(45) Date of Patent: Oct. 8, 2024

(54) UNMANNED AERIAL VEHICLE POSITIONING METHOD BASED ON MILLIMETER-WAVE RADAR

(71) Applicant: TONGJI UNIVERSITY, Shanghai (CN)

(72) Inventors: Bin He, Shanghai (CN); Gang Li, Shanghai (CN); Runjie Shen, Shanghai (CN); Yanmin Zhou, Shanghai (CN); Jie Chen, Shanghai (CN); Shuping Song, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 180 days.

(21) Appl. No.: 17/870,592

(22) Filed: Jul. 21, 2022

(65) Prior Publication Data
US 2022/0383755 A1 Dec. 1, 2022

Related U.S. Application Data

(63) Continuation of application No. PCT/CN2022/071564, filed on Apr. 2, 2022.

(30) Foreign Application Priority Data

May 28, 2021 (CN) .......................... 202110588348.7

(51) Int. Cl.
G08G 5/00 (2006.01)
B64C 39/02 (2023.01)
(52) U.S. Cl.
CPC ........... *G08G 5/006* (2013.01); *B64C 39/024* (2013.01); *B64U 2201/10* (2023.01)
(58) Field of Classification Search
CPC .... G08G 5/006; G08G 5/0052; G08G 5/0069; G08G 5/00; B64C 39/024; B64C 39/02;
(Continued)

(56) References Cited

U.S. PATENT DOCUMENTS 4,063,226 A * 12/1977 Kozma ................ G03H 1/0486
365/216
10,354,150 B2 * 7/2019 Yamazaki ............ H04N 13/246
(Continued)

FOREIGN PATENT DOCUMENTS

CN 109945856 A 6/2019
CN 110794392 A 2/2020
(Continued)

OTHER PUBLICATIONS

First Search Report issued in counterpart Chinese Patent Application No. 202110588348.7, dated May 17, 2022.

*Primary Examiner* — Yonel Beaulieu
(74) *Attorney, Agent, or Firm* — Westbridge IP LLC

(57) ABSTRACT

Disclosed is an unmanned aerial vehicle (UAV) positioning method based on a millimeter-wave radar, including a calibration stage and a positioning stage. The calibration stage includes: acquiring ground coordinates of the unmanned aerial vehicle; and extracting feature points from radar point cloud data and get the ground coordinates of the feature points. The positioning stage includes: acquiring radar point cloud data of a current frame and pre-processing; acquiring UAV motion data and fuse the data with radar point cloud data; extracting characteristic line segment from radar point cloud data; registering the characteristic line segment of the current frame with the characteristic line segment of the previous frame, and finding matching feature points and newly added feature points; and obtaining the ground coordinates of UAV and the ground coordinates of newly added feature points based on the ground coordinates of matched feature points on the map.

13 Claims, 3 Drawing Sheets

(58) Field of Classification Search
CPC ... B64U 2201/10; G01S 13/86; G01S 13/876; G01S 13/89; G01S 13/933
See application file for complete search history.

(56) References Cited

U.S. PATENT DOCUMENTS

| | | | | |
|---|---|---|---|---|
| 11,555,916 | B2 * | 1/2023 | Reynolds | G01S 13/9004 |
| 2005/0139776 | A1 * | 6/2005 | Reiter | G01T 1/36 |
| | | | | 250/394 |
| 2022/0138513 | A1 * | 5/2022 | Wienhold | G06T 7/97 |
| | | | | 382/159 |

FOREIGN PATENT DOCUMENTS

| | | | | |
|---|---|---|---|---|
| EP | 4307251 A1 * | 1/2024 | | B60W 30/06 |
| WO | WO-03102609 A1 * | 12/2003 | | G01Q 60/46 |

\* cited by examiner

UNMANNED AERIAL VEHICLE POSITIONING METHOD BASED ON MILLIMETER-WAVE RADAR

CROSS-REFERENCE TO RELATED APPLICATIONS

This application is a continuation of International Application No. PCT/CN2022/071564, filed on Apr. 2, 2022, which claims priority to Chinese Patent Application No. CN202110588348.7, filed on May 28, 2021. The contents of the forementioned applications are hereby incorporated by reference.

TECHNICAL FIELD

The application relates to the field of unmanned aerial vehicle (UAV) positioning, and in particular to an unmanned aerial vehicle positioning method based on a millimeter-wave radar.

BACKGROUND

With the progress of technology, the application of unmanned aerial vehicles (UAVs) is becoming wider, and the positioning of UAV is of great significance for safe operation. Based on global navigation satellite system (GNSS), the outdoor positioning and navigation technology of UAV has become mature, which can achieve meter-level accuracy. In an embodiment, by deploying a fixed differential base station, the positioning accuracy can reach centimeter level. However, in the space with weak global positioning system (GPS) signals, such as indoors and tunnels, the precise positioning of unmanned aerial vehicles is a hard problem and also a research hotspot.

At present, the indoor positioning methods of UAV mainly include: indoor positioning system, which realizes the positioning of UAV by arranging multiple positioning cameras indoors, and achieve centimeter-level positioning accuracy; Visual simultaneous localization and mapping (SLAM), modeling the environmental map by airborne camera or radar, and combining the motion information of the UAV to realize the positioning of the UAV; ultra-wideband (UWB) technology, including airborne module and base module; calculating the distance between the two modules by measuring the arrival time, arrival time difference or arrival angle of radio waves, and realizing the positioning of UAVs. There are also positioning schemes based on radio waves, such as the positioning of drones through Wifi, Zigbee™ and other communications.

However, the existing technology has defects and deficiencies, such as high cost and low positioning accuracy, the limitation of applicable scenes, the generally real-time application in special environment, and so on.

SUMMARY

The objective of this application is to provide an unmanned aerial vehicle (UAV) positioning method based on millimeter-wave radar in order to overcome the defects of the prior art, which carries out a feature point matching positioning based on the point cloud data of a millimeter-wave radar with high positioning accuracy. The millimeter-wave radar can reduce UAV load, improve UAV positioning accuracy, and realize UAV positioning all day long.

The objective of this application can be achieved by the following technical scheme.

A positioning method of an unmanned aerial vehicle (UAV) based on millimeter-wave radar, is equipped with millimeter-wave radar and inertail measurement unit (IMU), including a calibration stage and a positioning stage. The calibration stage includes:

S1, obtaining a map, radar point cloud data measured by a millimeter-wave radar, and ground coordinates of unmanned aerial vehicles;

S2, pre-processing radar point cloud data; extracting key points from radar point cloud data, obtaining characteristic line segment based on the key points, and recording the key points on the characteristic line segment as feature points;

S3, projecting the feature points on the map according to the ground coordinates of the UAV to obtain the ground coordinates of each feature point;

The Positioning Stage Includes:

S4, acquiring radar point cloud data of a current frame measured by millimeter-wave radar, and pre-processing the radar point cloud data;

S5, acquiring UAV motion data measured by IMU, and fusing radar point cloud data with UAV motion data to obtain corrected radar point cloud data;

S6, extracting key points from radar point cloud data, obtaining characteristic line segment based on the key points, and recording the key points on the characteristic line segment as feature points;

S7, registering the characteristic line segment of the radar point cloud data of the current frame with the characteristic line segment of the radar point cloud data of the previous frame, finding out the feature points matching the current frame with the previous frame, and marking them as a matched feature point, finding out a feature point increased by the current frame relative to the previous frame, and marking the point as newly added feature point;

S8, obtaining the ground coordinates of the unmanned aerial vehicle and the ground coordinates of newly added feature points based on the ground coordinates of the matched feature points on the map; and S9, repeating S4.

In an embodiment, the calibration stage also includes a coordinate calibration of millimeter-wave radar and IMU; specifically, according to the installation positions of millimeter-wave radar and IMU, establishing a coordinate transformation matrix between radar point cloud data and UAV motion data measured by IMU to complete the coordinate calibration.

In an embodiment, the pre-processing of radar point cloud data includes obtaining undeflected point cloud data; specifically, mapping three-dimensional radar point cloud data to a two-dimensional plane.

In an embodiment, the pre-processing of radar point cloud data includes noise filtering; specifically, eliminating discrete points in radar point cloud data by a direct elimination method, and downsampling the radar point cloud data by a voxel grid filter.

In an embodiment, the pre-processing of radar point cloud data includes point cloud registration; specifically, searching for the nearest point matching by an iterative algorithm, and converting the coordinates of radar point cloud data at the beginning and end of the same frame into the same coordinate system.

In an embodiment, S5 specifically includes:

acquiring UAV motion data measured by IMU, including an attitude angle, an angular velocity and a linear velocity; calculating a flight distance of UAV based on the attitude angle, angular velocity and linear velocity, and correcting the radar point cloud data based on the flight distance to obtain the corrected radar point cloud data.

In an embodiment, extracting key points from radar point cloud data includes the following steps:

determining the first point of radar point cloud data as a key point; traversing the remaining radar point cloud data, and if a point meets condition 1 or condition 2, the point is the key point; condition 1: the Euclidean distance between the key point and the previous key point is greater than the preset threshold value of the point distance; condition 2: the key point does not fall on the straight line 1 connected by the last two key points, and the distance between the key point and the straight line 1 exceeds the preset point-line distance threshold.

In an embodiment, obtaining the characteristic line segment based on the key points; specially, obtaining the characteristic line segment by the straight line fitting method, and each line is obtained by fitting at least four key points.

In an embodiment, S7 specifically includes:

calculating an angle difference and a distance difference between the characteristic line segment of the current frame and the characteristic line segment of the previous frame; if the angle difference and distance difference between the characteristic line segment of the current frame and the characteristic line segment of the previous frame are both smaller than a preset registration threshold, the two characteristic line segments are matched with each other;

for all the feature lines of the current frame, if a characteristic line segment finds a matching characteristic line segment, the feature points on the characteristic line segment are matched feature points; if a characteristic line segment does not find a matching characteristic line segment, the feature points on the characteristic line segment are newly added feature points.

In an embodiment, S8 specifically includes:

updating the ground coordinates of the unmanned aerial vehicle according to the coordinate changes of the matched feature points in the previous frame and the current frame; according to the coordinate relationship between the newly added feature points and the matched feature points in the current frame, the ground coordinates of the newly added feature points on the map are calculated.

Compared with the prior art, the application has the following beneficial effects:

based on the point cloud data of millimeter-wave radar, carrying out feature point matching positioning, which has high positioning accuracy; millimeter-wave radar can reduce the load of UAV, improve the positioning accuracy of UAV, and realize all-weather UAV positioning;

combining the radar point cloud data with the IMU measurement data, further improving the positioning accuracy, reducing the calculation amount, saving the calculation resources and ensuring the positioning speed and real-time perfoi nuance; and pre-processing the point cloud data, including the acquisition of undeflected point cloud data, noise filtering and point cloud registration, and obtaining point cloud data with higher accuracy and usability.

DETAILED DESCRIPTION OF THE EMBODIMENTS

The application will be described in detail with reference to the following drawings and specific examples. This embodiment is implemented on the premise of the technical scheme of this application, and a detailed implementation method and specific operation process are given, but the protection scope of this application is not limited to the following embodiments.

Embodiment 1

A positioning method of unmanned aerial vehicle (UAV) based on millimeter-wave radar, which is equipped with a millimeter-wave radar and inertial measurment unit (IMU). In this embodiment, the UAV module adopts the DJI UAV Matrice M100 UAV open platform, which has a maximum load of 3.6 kg and an effective flight time of 30 minutes. It is equipped with a LDBSD-100 millimeter-wave radar produced by Cheng-Tech, with a size of 77 mm*55 mm*21 mm (H*W*D) and a weight of 500 g, and the Modbus inertial measurement unit IMU527. In addition, this system also includes TX1 processor produced by NVIDIA™, which has 256 NVIDIA CUDA cores and 64-bit CPU, and can achieve a real-time processing of point cloud data.

Figure 1:
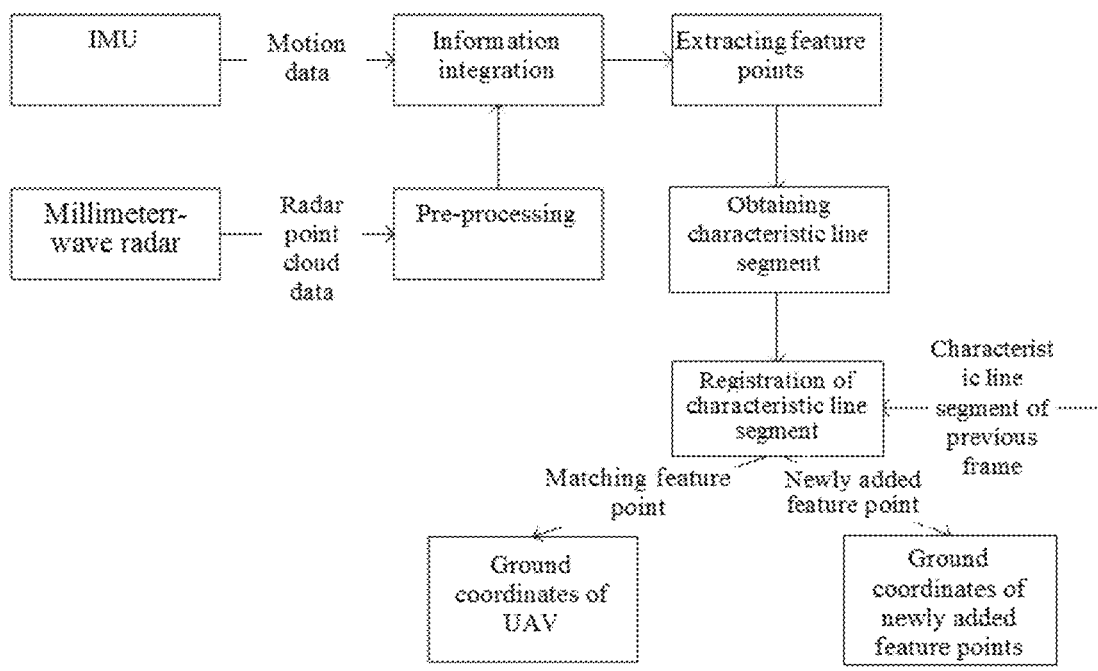
FIG. 1 is a flowchart according to this application.
Figure 3:
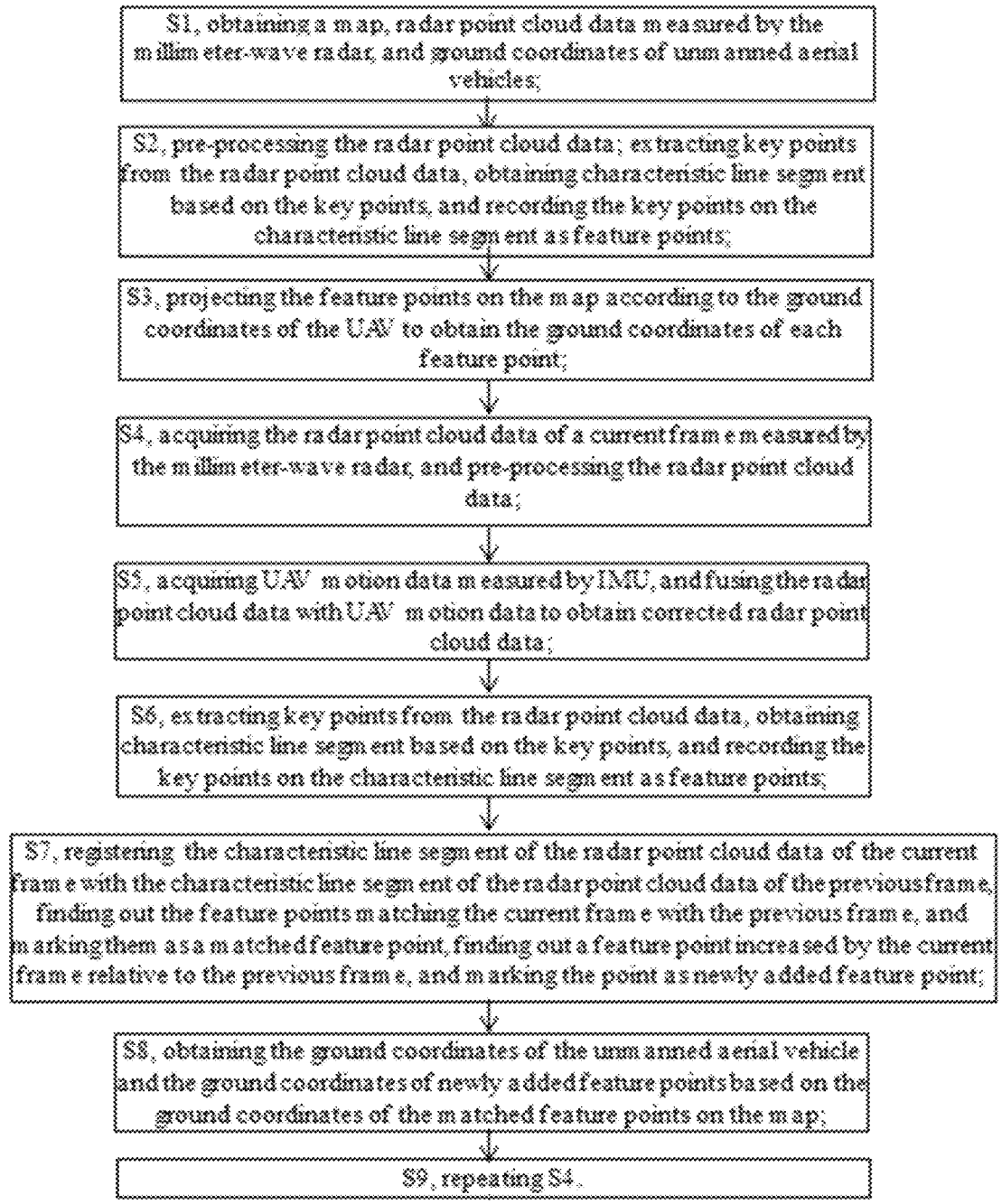
FIG. 3 is a flowchart of the steps according to this application.

As shown in FIG. 1 and FIG. 3, the UAV positioning method includes a calibration stage and a positioning stage. The calibration stage includes:

S1, obtaining a map; acquiring radar point cloud data measured by a millimeter-wave radar, and acquiring ground coordinates of unmanned aerial vehicles;

S2, pre-processing radar point cloud data; extracting key points from radar point cloud data, obtaining characteristic line segment based on the key points, and recording the key points on the characteristic line segment as feature points;

S3, projecting the feature points on the map according to the ground coordinates of the unmanned aerial vehicle to obtain the ground coordinates of each feature point;

the calibration stage also includes coordinate calibration of millimeter-wave radar and IMU; specifically, according to an installation position of millimeter-wave radar and IMU, establishing a coordinate transformation matrix between radar point cloud data and UAV motion data measured by IMU, and completing the coordinate calibration.

The positioning stage includes:

S4, acquiring radar point cloud data of a current frame measured by the millimeter-wave radar, and pre-processing;

S5, acquiring UAV motion data measured by IMU, and fusing radar point cloud data with UAV motion data to obtain corrected radar point cloud data;

S6, extracting key points from radar point cloud data, obtaining the characteristic line segment based on the key points, and recording the key points on the characteristic line segment as feature points;

S7, registering the characteristic line segment of the radar point cloud data of the current frame with the characteristic line segment of the radar point cloud data of the previous frame, finding out the feature points matching the current frame with the previous frame, and marking the points as matched feature points, finding out the feature points increased by the current frame relative to the previous frame, and marking them as newly added feature points;

S8, based on the ground coordinates of the matched feature points on the map, the ground coordinates of the unmanned aerial vehicle and the ground coordinates of newly added feature points are obtained; and S9, repeating S4.

The application is based on the point cloud data of the millimeter-wave radar for feature point matching and positioning with a high accuracy; the millimeter-wave radar can reduce the load of UAVs, improve the positioning accuracy of UAV, and can perform positioning of UAVs all day (except rainy days).

Pre-processing radar point cloud data includes obtaining undeflected point cloud data, and obtaining undeflected point cloud data; specifically: mapping three-dimensional radar point cloud data to a two-dimensional plane. Because the change of UAV's flight attitude (roll angle, pitch angle) will affect the reading of lidar, the influence is reduced by mapping lidar data in three-dimensional environment to two-dimensional X-Y plane.

The lidar data in the three-dimensional environment is mapped to the two-dimensional X-Y plane, and three coordinate systems are determined, consisting of ground coordinate system E, UAV coordinate system B and inertial coordinate system I. IMU measures the attitude angle ($(\phi, \theta, \psi)$) of UAV, where $\phi$ is roll angle, $\theta$ is pitch angle and $\psi$ is yaw angle. Obtaining a projection matrix from B to I according to the installation position of IMU:

$$T = \begin{bmatrix} \cos\theta & \sin\theta\sin\phi & \sin\theta\cos\phi \\ 0 & \cos\phi & -\sin\phi \\ -\sin\theta & \cos\theta\sin\phi & \cos\theta\cos\phi \end{bmatrix}$$

Letting the polar coordinate of the data be $((r_i, \xi_i))$ in the B coordinate system, which is expressed as $[r_i \cos \xi_i, \sin \xi_i, 0]^T$ in the Cartesian coordinate system, and obtained after rotation transformation:

$P_i = T[r_i \cos \xi_i, \sin \xi_i, 0]^T$

Taking the yaw angle as assistant in order to ensure that the matching direction of the point cloud does not change, so that the scanning data will not rotate with the rotation of the UAV:

$P_i = T[r_i \cos(\xi - \psi)_i, \sin(\xi_i - \psi), 0]^T$

The pre-processing of radar point cloud data includes noise filtering; specifically, eliminating discrete points in radar point cloud data by direct elimination method, and downsampling the radar point cloud data by voxel grid filter. In this embodiment, the statistical outlier elimination algorithm provided by point cloud library (PCL) is used to analyze the point cloud and propose the points that do not meet the characteristics. For downsampling, voxel grid filter is used to reduce the density of point cloud.

Pre-processing radar point cloud data includes point cloud registration. Point cloud registration refers to searching the nearest point for matching by iterative algorithm, and converting the coordinates of radar point cloud data at the beginning and end of the same frame into the same coordinate system. Because the millimeter-wave radar is placed on a moving UAV, the coordinate system of the point cloud in the same frame will shift, resulting in a displacement between the beginning and the end of each frame. Therefore, in this application, converting the coordinates of the point cloud data at the beginning and the end of the frame by iterative algorithm to obtain accurate point cloud data in the same coordinate system. In this embodiment, the iterative nearest point (ICP) algorithm is used for registration and distortion correction.

Considering the movement of the UAV, it is necessary to correct the radar point cloud data. S5 specifically includes: acquiring UAV movement data measured by IMU, including attitude angle, angular velocity and linear velocity; calculating the flight distance of the unmanned aerial vehicle based on attitude angle, angular velocity and linear velocity; obtaining corrected radar point cloud data by correcting the radar point cloud data based on the flight distance.

In this embodiment, the angular velocity and linear velocity of the UAV are obtained from the serial port through the DJI Onboard SDK protocol; obtaining radar motion information integration, and then correcting the laser point cloud by using the obtained motion information. Obtaining the attitude angle $((\phi, \theta, \psi))$, the altitude Z of the UAV and the flying speed $v_x$, $V_y$ of the horizontal plane directly from the IMU data of the UAV, and obtaining the flight distance by integrating the speeds in a certain time interval:

$$\begin{bmatrix} \Delta x \\ \Delta y \end{bmatrix} = \int_{t1}^{t1+\Delta t} \begin{bmatrix} v_x \\ v_y \end{bmatrix} t$$

Correcting the laser point cloud by using the obtained motion information, and then using the feature point matching method to estimate the motion to further reduce the matching error rate.

In order to perform positioning, this application discloses a positioning method based on feature point matching. In the calibration stage, the position information of the UAV is known when it is initialized, and the feature points are extracted from the point cloud data of the UAV and the ground coordinates of the feature points are recorded. In the positioning stage, when the UAV flies, for each frame of collected point cloud data, finding out the feature points of the current frame and the previous frame, so that the ground coordinates of the UAV are updated according to the coordinate transformation of the matched feature points in the two frames.

Extracting feature points from radar point cloud data includes:

determining the first point of radar point cloud data as a key point; traversing the remaining radar point cloud data, and if a point meets condition 1 or condition 2, the point is the key point; condition 1: the Euclidean distance between the key point and the previous key point is greater than the preset threshold value of the point distance; condition 2: the key point does not fall on the straight line 1 connected by the last two key points, and the distance between the key point and the straight line 1 exceeds the preset threshold value of the distance between points and lines; after obtaining the key points, obtaining the characteristic line segment based on the key points, specifically: obtaining the characteristic line segment by using a straight line fitting method, such as the least square method, and each characteristic line segment is obtained by fitting at least four key points.

The registration of characteristic line segments is as follows:

calculating the angle difference and distance difference between the characteristic line segment of the current frame and the characteristic line segment of the previous frame; if the angle difference and distance difference between a characteristic line segment of the current frame and a characteristic line segment of the previous frame are both smaller than the preset registration threshold, the two characteristic line segments match each other.

For all the feature segments of the current frame, if a feature segment finds a matching feature segment, the feature points on the feature segment are matched feature points; if a characteristic line segment does not find a matching characteristic line segment, the feature point on the characteristic line segment is a new feature point.

Figure 2:
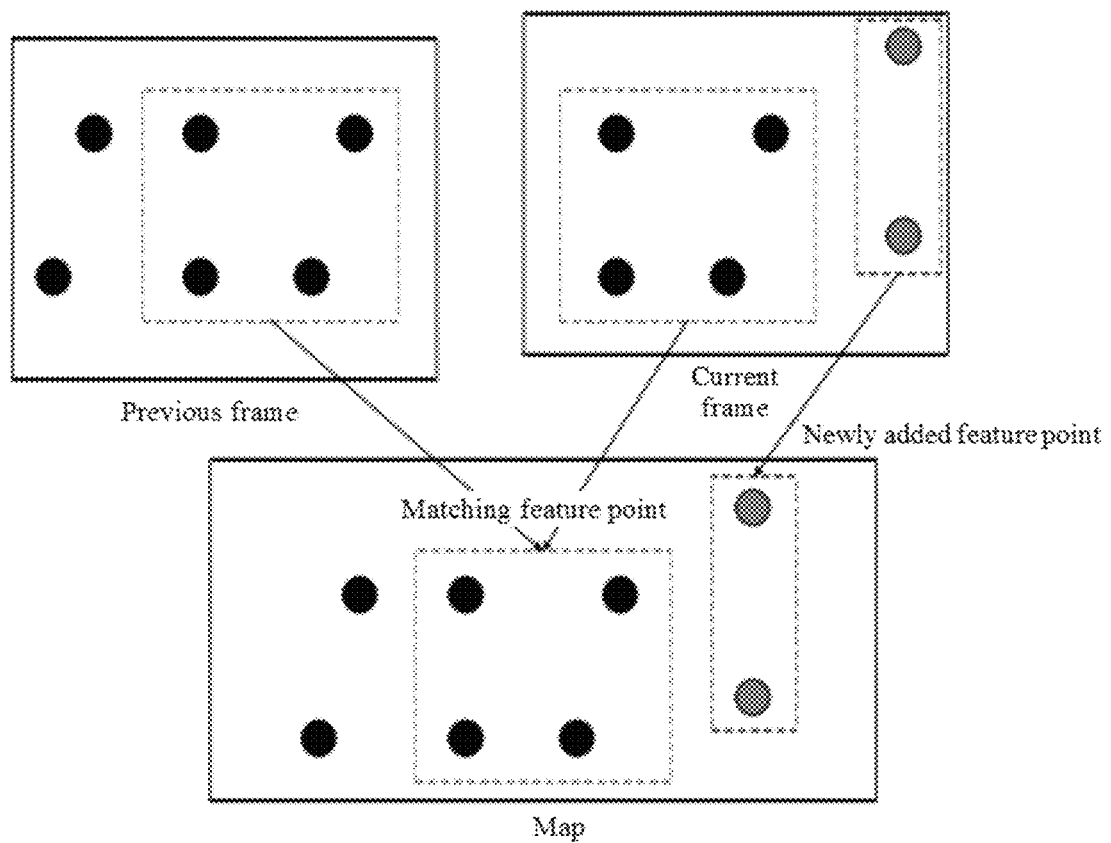
FIG. 2 is a schematic diagram of feature point tracking.

As shown in FIG. 2, let $point_{match}$ represents the set of matching feature points, $point_{origin}$ is the set of feature points in the previous frame, $point_{obj}$ is the set of feature points in the current frame, and $point_{match}=point_{origin} \cap point_{obj}$, then the set of newly added feature $point_{Lidar}=point_{obj}-point_{match}$.

After the characteristic line segments correspond well, the offset angle of the two characteristic line segments is the relative yaw angle ψ of the cloud images of two frames, so as to compensate the yaw angle measured by IMU. When the relative yaw angle is obtained, the point cloud is rotated, so that there is only a translation relationship between the current frame and the map. Assuming that the slope of the straight line L1 is k1 and the slope of L2 is k2, the magnitude of the deflection angle Δψ can be obtained:

$$\Delta \psi = \arctan \left| \frac{k_2 - k_1}{(1 + k_2 \cdot k_1)} \right|$$

Carrying out the location after the matching feature points are obtained. With reference to FIG. 2, S8 specifically includes:

the ground coordinates of the matched feature points on the map are determined points, and the ground coordinates of the UAV are updated according to the coordinate changes of the matched feature points in the previous frame and the current frame; according to the coordinate relationship between the newly added feature points and the matched feature points, the ground coordinates of the newly added feature points on the map are calculated for the next matching.

The preferred embodiments of this application have been described in detail above. It should be understood that those of ordinary skill in the art may make many modifications and changes according to the concept of this application without creative labor. Therefore, all technical solutions that can be obtained by those skilled in the technical field through logical analysis, reasoning or limited experiments on the basis of the prior art according to the concept of this application should be within the scope of protection determined by the claims.

What is claimed is:

1. A positioning method of an unmanned aerial vehicle (UAV) based on a millimeter-wave radar, wherein the UAV is equipped with the millimeter-wave radar and an inertial measurement unit (IMU), comprising a calibration stage and a positioning stage; wherein the calibration stage comprises:
   S1, obtaining a map, radar point cloud data measured by the millimeter-wave radar, and ground coordinates of unmanned aerial vehicles;
   S2, pre-processing the radar point cloud data; extracting key points from the radar point cloud data, obtaining characteristic line segment based on the key points, and recording the key points on the characteristic line segment as feature points;
   S3, projecting the feature points on the map according to the ground coordinates of the UAV to obtain the ground coordinates of each feature point;
   wherein the positioning stage comprises:
   S4, acquiring the radar point cloud data of a current frame measured by the millimeter-wave radar, and pre-processing the radar point cloud data;
   S5, acquiring UAV motion data measured by IMU, and fusing the radar point cloud data with UAV motion data to obtain corrected radar point cloud data;
   S6, extracting key points from the radar point cloud data, obtaining characteristic line segment based on the key points, and recording the key points on the characteristic line segment as feature points;
   S7, registering the characteristic line segment of the radar point cloud data of the current frame with the characteristic line segment of the radar point cloud data of the previous frame, finding out the feature points matching the current frame with the previous frame, and marking them as a matched feature point, finding out a feature point increased by the current frame relative to the previous frame, and marking the point as newly added feature point;
   S8, obtaining the ground coordinates of the unmanned aerial vehicle and the ground coordinates of newly added feature points based on the ground coordinates of the matched feature points on the map; and
   S9, repeating S4.

2. The method according to claim 1, wherein the calibration stage further comprises:
   establishing a coordinate transformation matrix between radar point cloud data and UAV motion data measured by IMU according to the installation positions of the millimeter-wave radar and IMU, to complete the coordinate calibration.

3. The method according to claim 1, wherein pre-processing the radar point cloud data comprises obtaining undeflected point cloud data.

4. The method according to claim 3, wherein obtaining undeflected point cloud data comprises mapping three-dimensional radar point cloud data to a two-dimensional plane.

5. The method according to claim 3, wherein pre-processing the radar point cloud data comprises noise filtering.

6. The method according to claim 5, wherein noise filtering comprises eliminating discrete points in radar point cloud data by direct elimination method, and downsampling the radar point cloud data by a voxel grid filter.

7. The method according to claim 5, wherein pre-processing the radar point cloud data comprises point cloud registration.

8. The method according to claim 7, wherein point cloud registration comprises searching for the nearest point matching by iterative algorithm, and converting the coordinates of radar point cloud data at the beginning and end of the same frame into the same coordinate system.

9. The method according to claim 1, wherein S5 comprises:
   acquiring UAV motion data measured by IMU, comprising attitude angle, angular velocity and linear velocity; calculating a flight distance of UAV based on the attitude angle, angular velocity and linear velocity, and correcting the radar point cloud data based on the flight distance to obtain the corrected radar point cloud data.

10. The method according to claim 1, wherein extracting key points from radar point cloud data comprises:
determining the first point of radar point cloud data as a key point; traversing the remaining radar point cloud data, and if a point meets condition 1 or condition 2, the point is the key point; condition 1: the Euclidean distance between the key point and the previous key point is greater than the preset threshold value of the point distance; condition 2: the key point does not fall on the straight line 1 connected by the last two key points, and the distance between the key point and the straight line 1 exceeds the preset point-line distance threshold.

11. The method according to claim 1, wherein obtaining the characteristic line segment based on the key points comprises obtaining the characteristic line segment by the straight line fitting method, and each line is obtained by fitting at least four key points.

12. The method according to claim 1, wherein S7 comprises:
calculating an angle difference and a distance difference between the characteristic line segment of the current frame and the characteristic line segment of the previous frame; determining the two characteristic line segments are matched with each other if the angle difference and distance difference between the characteristic line segment of the current frame and the characteristic line segment of the previous frame are both smaller than a preset registration threshold; and
determining feature points on a characteristic line segment are matched feature points if the characteristic line segment finds a matching characteristic line segment; determining feature points on a characteristic line segment are newly added feature points if the characteristic line segment does not find a matching characteristic line segment.

13. The method according to claim 1, wherein S8 comprises:
updating the ground coordinates of the unmanned aerial vehicle according to the coordinate changes of the matched feature points in the previous frame and the current frame; calculating the ground coordinates of the newly added feature points on the map according to the coordinate relationship between the newly added feature points and the matched feature points in the current frame.

* * * * *